United States Patent
Kuriki et al.

(10) Patent No.: US 7,580,675 B2
(45) Date of Patent: Aug. 25, 2009

(54) DATA COMMUNICATION APPARATUS FUNCTIONING AS ID TAG AND ID-TAG READER AND WRITER

(75) Inventors: Shoji Kuriki, Kanagawa-ken (JP); Tatsuya Fujii, Hyogo-ken (JP); Shinji Yoshioka, Ohsaka-fu (JP)

(73) Assignee: Ricoh Company, Ltd., Tokyo (JP)

( * ) Notice: Subject to any disclaimer, the term of this patent is extended or adjusted under 35 U.S.C. 154(b) by 485 days.

(21) Appl. No.: 11/271,044

(22) Filed: Nov. 11, 2005

(65) Prior Publication Data

US 2006/0240775 A1 Oct. 26, 2006

(30) Foreign Application Priority Data

Dec. 20, 2004 (JP) .............................. 2004-367279

(51) Int. Cl.
*H04B 5/00* (2006.01)
(52) U.S. Cl. .................... 455/41.1; 455/106; 455/41.2; 455/44; 340/572.1; 340/10.4; 340/825.54; 340/572.5; 340/825.34; 711/108; 711/128; 711/207
(58) Field of Classification Search ................ 455/41.2; 340/572.3, 572.1, 571, 10.4, 572.5, 10.31, 340/10.2, 825.54, 825.34; 711/108, 207, 711/128
See application file for complete search history.

(56) References Cited

U.S. PATENT DOCUMENTS

| | | | | |
|---|---|---|---|---|
| 5,892,441 | A * | 4/1999 | Woolley et al. | 340/539.26 |
| 5,995,006 | A * | 11/1999 | Walsh | 340/572.7 |
| 6,340,931 | B1 * | 1/2002 | Harrison et al. | 340/572.1 |
| 6,512,478 | B1 * | 1/2003 | Chien | 342/357.09 |
| 6,657,543 | B1 * | 12/2003 | Chung | 340/573.1 |
| 6,703,930 | B2 * | 3/2004 | Skinner | 340/539.11 |
| 6,779,721 | B2 * | 8/2004 | Larson et al. | 235/382 |
| 6,853,739 | B2 * | 2/2005 | Kyle | 382/115 |
| 6,867,683 | B2 * | 3/2005 | Calvesio et al. | 340/5.52 |
| 7,002,473 | B2 * | 2/2006 | Glick et al. | 340/572.1 |
| 7,012,529 | B2 * | 3/2006 | Sajkowsky | 340/572.1 |
| 7,019,650 | B2 * | 3/2006 | Volpi et al. | 340/572.1 |
| 7,044,387 | B2 * | 5/2006 | Becker et al. | 235/492 |
| 7,072,613 | B2 * | 7/2006 | Tanaka et al. | 455/13.3 |

(Continued)

FOREIGN PATENT DOCUMENTS

JP 2003-150916 5/2003

*Primary Examiner*—Marceau Milord
(74) *Attorney, Agent, or Firm*—Cooper & Dunham, LLP

(57) ABSTRACT

A data communication apparatus includes an antenna, an analog front-end circuit, and a controller. The analog front-end circuit is connected between the antenna and the controller and includes first and second modulators, a driver, a demodulator, and an input switch. The first modulator modulates data to be transmitted to a read-write device as a response to a request from said read-write device and sends the modulated data to the antenna. The second modulation circuit modulates data to be transmitted to other ID tags. The driver amplifies an output from the second modulator to drive the antenna. The demodulator demodulates data sent from the other ID tags and ID-tag read-write devices. The input switch selectively inputs the data to the first or second modulator. This abstract is provided to comply with rules requiring an abstract, and it is submitted with the intention that it will not be used to interpret or limit the scope or meaning of the claims.

13 Claims, 3 Drawing Sheets

U.S. PATENT DOCUMENTS 7,133,432 B2 * 11/2006 Kuffner et al. .............. 375/137
7,339,469 B2 * 3/2008 Braun ................... 340/539.13
7,496,329 B2 * 2/2009 Patel et al. ................. 455/41.2

* cited by examiner

DATA COMMUNICATION APPARATUS FUNCTIONING AS ID TAG AND ID-TAG READER AND WRITER

BACKGROUND

1. Field

This patent specification describes a data communication apparatus, and more particularly a data communication apparatus capable of functioning as an ID tag and an ID-tag read-write device in a relatively compact structure.

2. Discussion

An electric identification tag has come into widespread use for identification of materials such as products in shops, for example, since it is smaller and less expensive and can contains an overwhelming amount of information in comparison with a barcode system. For example, in a second-hand car dealer, an identification tag (hereinafter referred to as an ID tag) is attached to each of cars for sale there. Each one of the ID tags attached to the cars in the shop has a memory in which various kinds of detailed information of the car are stored. All the information can be read wirelessly with a special tool called an ID-tag read-write device. With this system, a buyer who is interested in buying a specific car can read various kinds of detailed information about the car, such as its detailed technical specification and history, for example, only by bringing the ID-tag read-write device close to the ID tag of that specific car.

With an increasing use of such ID tags, the ID-tag read-write device has been combined with the function of the ID tag so that the ID-tag read-write device can also be used as an ID tag.

A background ID-tag read-write device that serves as the ID tag as well as the ID-tag read-write device includes a wireless communicator 1 which includes a passive communicator 2 and an active communicator 3, as shown in FIG. 1. The passive communicator 2 serves as an ID tag to receive a command signal sent from an external apparatus and to return a response signal in response to the command signal. The active communicator 3 serves as an ID-tag read-write device to send a command signal to other apparatuses and to receive response signals from other apparatuses.

The passive communicator 2 is configured to receive signals of a sleep request and a sleep-termination request in addition to the read and write command signals sent from external apparatuses in order to prevent radio interferences caused by other ID tags and ID-tag read-write devices existing together in a wireless communications area. The passive communicator 2 falls into sleep upon receiving a sleep request signal and then it does not respond to the read and write command signals sent from external apparatuses. For example, when a plurality of passive communicators 2 are existing together in a wireless communications area, the plurality of passive communicators 2 except for a specific one are all set to a sleep mode so that the radio interferences caused by other passive communicators 2 can be prevented.

The passive communicator 2 includes a status holder 4 which holds a status of the sleep mode so that the passive communicator 2 is held in the sleep mode until the passive communicator 2 receives the sleep-termination request signal and terminates the sleep mode.

The active communicator 3 is configured to transmit signals of a sleep request and a sleep-termination request to external apparatuses, in addition to the read and write request signals, and to receive response signals from the external apparatuses in response to these sleep and sleep-termination request signals. That is, the active communicator 3 causes a counterpart of the communications to fall into sleep by transmitting the sleep request signal, and to terminate the sleep by transmitting the sleep-termination request signal. Further, before sending any request signals to external apparatuses, the active communicator 3 reads the status of the sleep mode stored in the status holder 4 of the passive communicator 2 and accordingly determines whether or not the passive communicator 2 is in the sleep mode. When the passive communicator 2 is determined as in the sleep mode, the active communicator 3 disables an output of the request signals. Thus, interferences among the request signals to each other can be prevented in a case where a plurality of active communicator 3 are existing together in a same wireless communications area.

BRIEF SUMMARY

This patent specification describes a novel data communication apparatus which is equipped with an ID-tag function and an ID-tag read-write function in a relatively compact configuration. In one example, a novel data communication apparatus includes an antenna, an analog front-end circuit, and a control circuit. The antenna is configured to receive a signal from other ID tags and to send a signal the apparatus. The control circuit is configured to generate data. The analog front-end circuit electrically is connected between the antenna and the control circuit and includes first and second modulation circuits, a driver circuit, a demodulation circuit, and an input switch. The first modulation circuit is configured to modulate data to be transmitted to a read-write device as a response to a request from said read-write device and to send the modulated data to the antenna. The second modulation circuit is configured to modulate data to be transmitted to other ID tags. The driver circuit is configured to amplify an output from the second modulation circuit to drive the antenna. The demodulation circuit is configured to demodulate data sent from the other ID tags and the other ID-tag read-write devices. The input switch is configured to selectively input data to one of the first and second modulation circuits, the data being sent from the control circuit to the analog front-end circuit.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
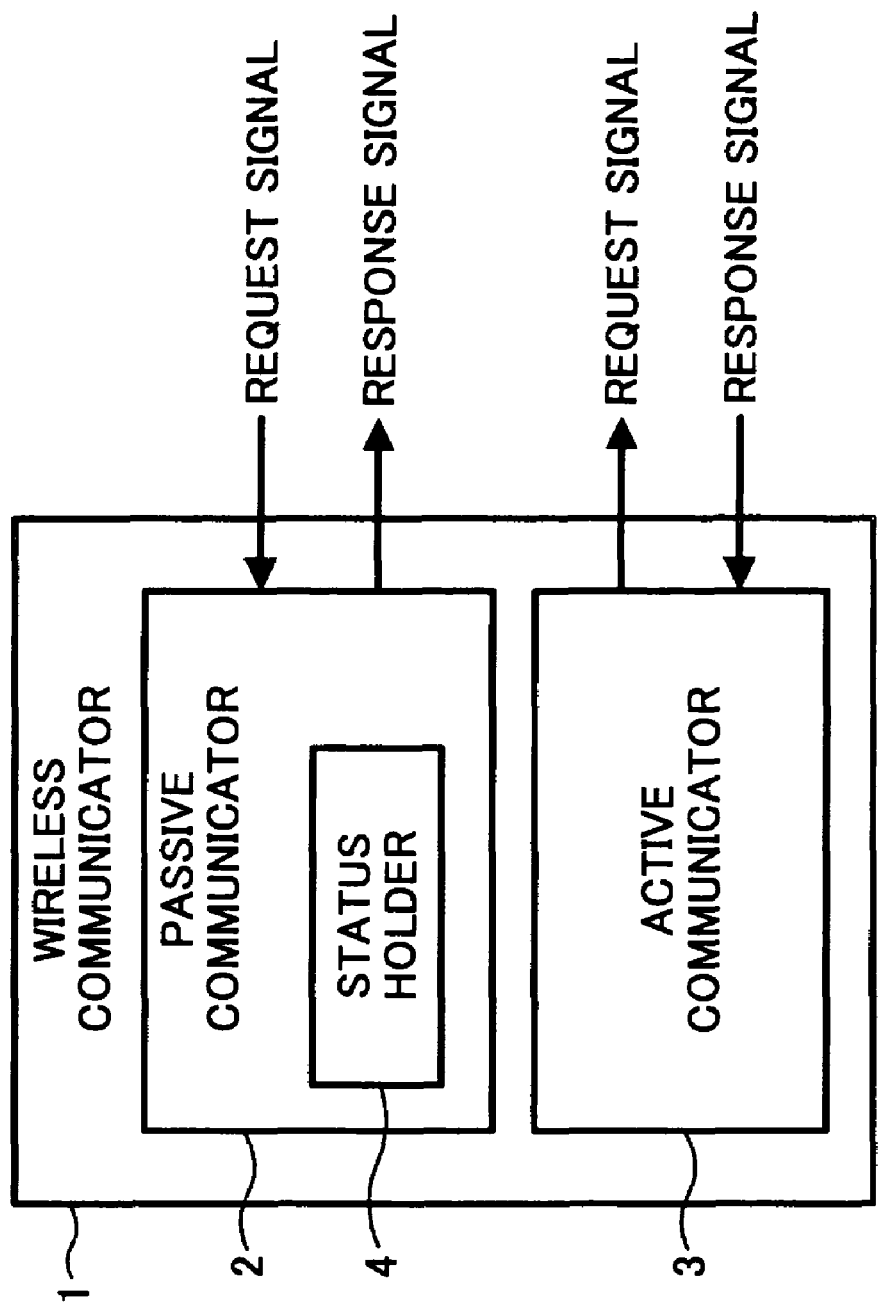
FIG. 1 is a block diagram of a background data communications apparatus.

In describing preferred embodiments illustrated in the drawings, specific terminology is employed for the sake of clarity. However, the description of this patent specification is not intended to be limited to the specific terminology so selected and it is to be understood that each specific element includes all technical equivalents that operate in a similar manner.

Figure 2:
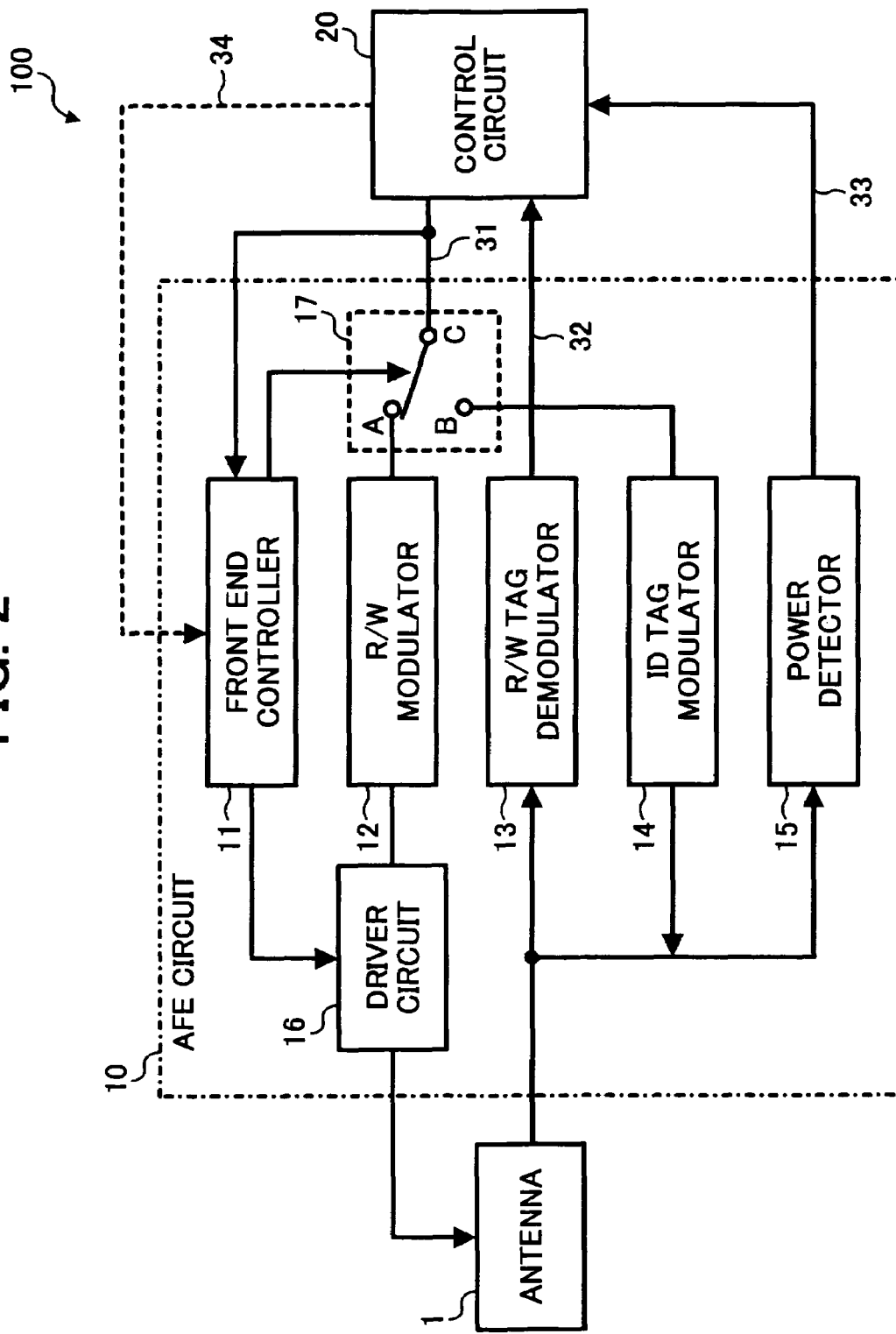
FIG. 2 is a block diagram of a data communications apparatus according to an embodiment.

Referring now to the drawings, wherein like reference numerals designate identical or corresponding parts throughout the several views, particularly to FIG. 2, a wireless communications apparatus 100 according to an example embodiment is explained. FIG. 2 illustrates a block diagram of the wireless communications apparatus 100 which has a wireless ID (identification)-tag function and a wireless ID-tag read-write function. The wireless ID-tag function is generally provided to a wireless ID tag to send information by radio to other wireless communications apparatuses in response to their requests transmitted on-air and to rewrite information previously recorded therein in response to the requests transmitted on-air from other wireless communications apparatuses. The wireless ID-tag read-write function is to read and write on-air information stored in other wireless ID tags provided to various kinds of materials such as products in shops, for example, to indicate their identifications.

Accordingly, when the wireless communications apparatus 100 of FIG. 2 operates in a wireless network together with a plurality of wireless communications apparatuses similarly including the wireless ID-tag function and the wireless ID-tag read-write function, the wireless communications apparatus 100 selectively serves as a wireless ID tag or as a wireless ID-tag read-write apparatus. That is, the wireless communications apparatus 100 operates as a wireless ID tag when one of other wireless communications apparatuses and as a wireless ID-tag read-write apparatus when other wireless communications apparatuses operate as wireless ID-tags.

The wireless communications apparatus 100 is preferably made in a transportable form, such as a cellular phone, a portable type memory, a portable digital audio device, a digital camera, and a PDA (personal data assistance), for example. However, the wireless communications apparatus 100 is not limited to these examples but can be a device which is detachably installed in equipment fixed on the ground or an apparatus firmly or detachably mounted to a mobile facility such as a vehicle, for example.

As illustrated in FIG. 2, the wireless communications apparatus 100 includes an antenna 1, an analog front end (AFE) circuit 10, and a control circuit 20. The AFE circuit 10 includes a front end controller 11, an R/W (read and write) modulator 12, an R/W tag demodulator 13, an ID tag modulator 14, a power detector 15, a driver circuit 16, and an input switch 17.

The AFE circuit 10 is connected to the antenna 1 and to the control circuit 20 and is configured to modulate and demodulate data. The front end controller 11 controls the operations of the AFE circuit 10 and exchanges data with the control circuit 20. The R/W modulator 12, which may be referred to as a second modulator, modulates data to be transmitted to other wireless ID tags (not shown). The driver circuit 16 amplifies an output from the R/W modulator 12 and drives the antenna 1 with the amplified output. The ID tag modulator 14, which may be referred to as a first modulator, modulates data to be transmitted as responses to the requests from other wireless ID tags (not shown). The R/W demodulator 13 demodulates data received as responses from other wireless ID tags and data received from other wireless ID-tag read-write apparatuses. The power detector 15 detects an event in which the antenna 1 receives data by radio waves from other wireless ID-tag read-write apparatuses. The input switch 17 switches back and forth between the R/W modulator 12 and the ID-tag modulator 14 for an entry of data transmitted from the control circuit 20.

Figure 3:
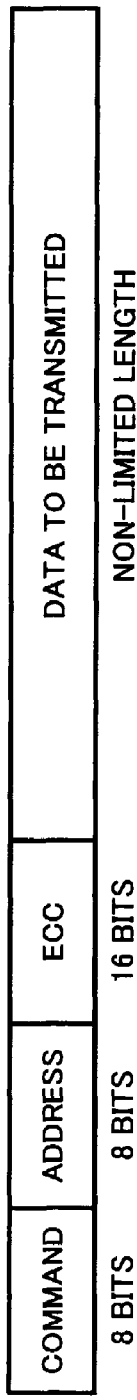
FIG. 3 is an illustration for explaining a serial data format used by the data communication apparatus of FIG. 2.

The control circuit 20 is connected with the AFE circuit 10 by a plurality of signal lines including a serial input line 31, a serial output line 32, and a wake line 33 to exchange digital signals therebetween. Digital signals from the control circuit 20 are transmitted to the AFE circuit 10 through the serial input line 31. Each of the digital signals includes a command signal, an address signal, an error signal (ECC), and transmission data, as illustrated in FIG. 3. Each of the command signal and the address signal has an 8-bit length, for example, and the error signal has a 16-bit length, for example. The transmission data has a limitless length.

The input switch 17 is provided with terminals A, B, and C. The terminal A is connected to the R/W modulator 12, the terminal B is connected to the ID-tag modulator 14, and the terminal C is connected to the control circuit 20 through the serial input line 31. The front end controller 11 is connected to the serial input line 31 so as to receive signals from the control circuit 20 through the serial input line 31. The front end controller 11 is also connected to the input switch 17 which receives the same signal sent from the control circuit 20 to the front end controller 11 through the serial input line 31. Upon receiving the signal from the control circuit 20, the front end controller 11 analyzes commands included in the received signal. When the command signal is analyzed as a command for instructing the AFE circuit 10 to act as an ID-tag read-write device, the front end controller 11 selects the terminal A of the input switch 17 so as to connect the serial input line 31 to the input terminal of the R/W modulator 12. Alternatively, when the command signal is analyzed as a command for instructing the AFE circuit 10 to act as an ID tag, the front end controller 11 selects the terminal B of the input switch 17 so as to connect the serial input line 31 to the input terminal of the ID-tag modulator 14. Thus, the single line of serial input line 31 is sufficient to connect between the AFE circuit 10 and the control circuit 20. In this way, this structure has an apparent effect of suppressing an increasing wiring space and cost, particularly in a case where a plurality of the AFE circuits 10 are provided to a single device of the control circuit 20 and, moreover, each of the plurality of the AFE circuits 10 is located away from the control circuit 20.

The front end controller 11 activates the driver circuit 16 to excite the antenna 1 upon a receipt of a command from the control circuit 20 for starting an output of carrier waves, and deactivates the driver circuit 16 to stop exciting the antenna 1 upon a receipt of a command from the control circuit 20 for stopping an output of the carrier waves.

The serial output line 32 connecting the R/W demodulator 13 of the AFE circuit 10 to the control circuit 20 transmits information sent from other read-write devices when the front end controller 11 is in an ID-tag mode and transmits information sent from other ID tags when the front end controller 11 is in a read-write device mode.

The power detector 15 detects an electromotive force to generate a signal WAKE and transmits the signal WAKE to the control circuit 20 through the wake line 33 when the antenna 1 is excited by radio waves sent from other read-write devices at a condition in which the AFE circuit 10 is not performing the read-write function. Upon receiving the signal WAKE from the power detector 15, the control circuit 20 is activated even when the control circuit 20 is in a standby mode and transmits a command for instructing the AFE circuit 10 to act as the ID tag.

The R/W modulator 12 is connected to the terminal A of the input switch 17 and is activated in a case when the AFE circuit 10 acts as the ID-tag read-write device. The R/W modulator 12 modulates the data sent from the control circuit 20 with an amplitude shift keying (ASK) method and sends the modulated data to the driver circuit 16.

The ID tag modulator 14 is connected to the terminal B of the input switch 17 and is activated in a case when the AFE circuit 10 acts as the ID tag. The ID tag modulator 14 modulates the data sent from the control circuit 20 with a load switching method (also referred to as a load modulation method) and sends the modulated data to the antenna 1.

The R/W tag demodulator 13 is activated in both cases when the AFE circuit 10 acts as the ID-tag read-write device and as the ID tag. Upon receiving a signal from the antenna 1, the R/W tag demodulator 13 demodulates and converts the signal into a digital signal and transmits the digital signal to the control circuit 20 via the serial output line 32. In this example, the R/W tag modulator uses the ASK method for demodulation. That is, the wireless communications apparatus 100 is provided with a single demodulator (i.e., the R/W tag demodulator 13) for demodulating the signal in both cases when the AFE circuit 10 acts as the ID-tag read-write device and as the ID tag. With this configuration, the wireless communications apparatus 100 can be made in a relatively small size. The modulation methods of the ASK method and the load switching method are applied to the R/W modulator 12 and the ID-tag modulator 14, respectively. In particular, the application of the load switching method which conforms to the ISO standards to the ID-tag modulator 14 expands the general versatility of the front end circuit portion (i.e., the AFE circuit 10) of the wireless communications apparatus 100. As a result, the AFE circuit 10 can be used in a variety of different wireless communications systems. Moreover, the AFE circuit 10 can be integrated into a single integrated circuit which is generally suitable for mass production with a relatively low cost.

In this example, the control circuit 20 sends the signal for switching the input switch 17 to the front end controller 11 through the serial input line 31. As an alternative to this, the control circuit 20 may send such a signal for switching the input switch 17 to the front end controller 11 through a communication line 34 which independently connects the front end controller 11 to the control circuit 20. Upon receiving the signal for switching the input switch 17 from the control circuit 20, the front end controller 11 sends this signal to the input switch 17 to switch between the terminals A and B of the input switch 17.

Figure 4:
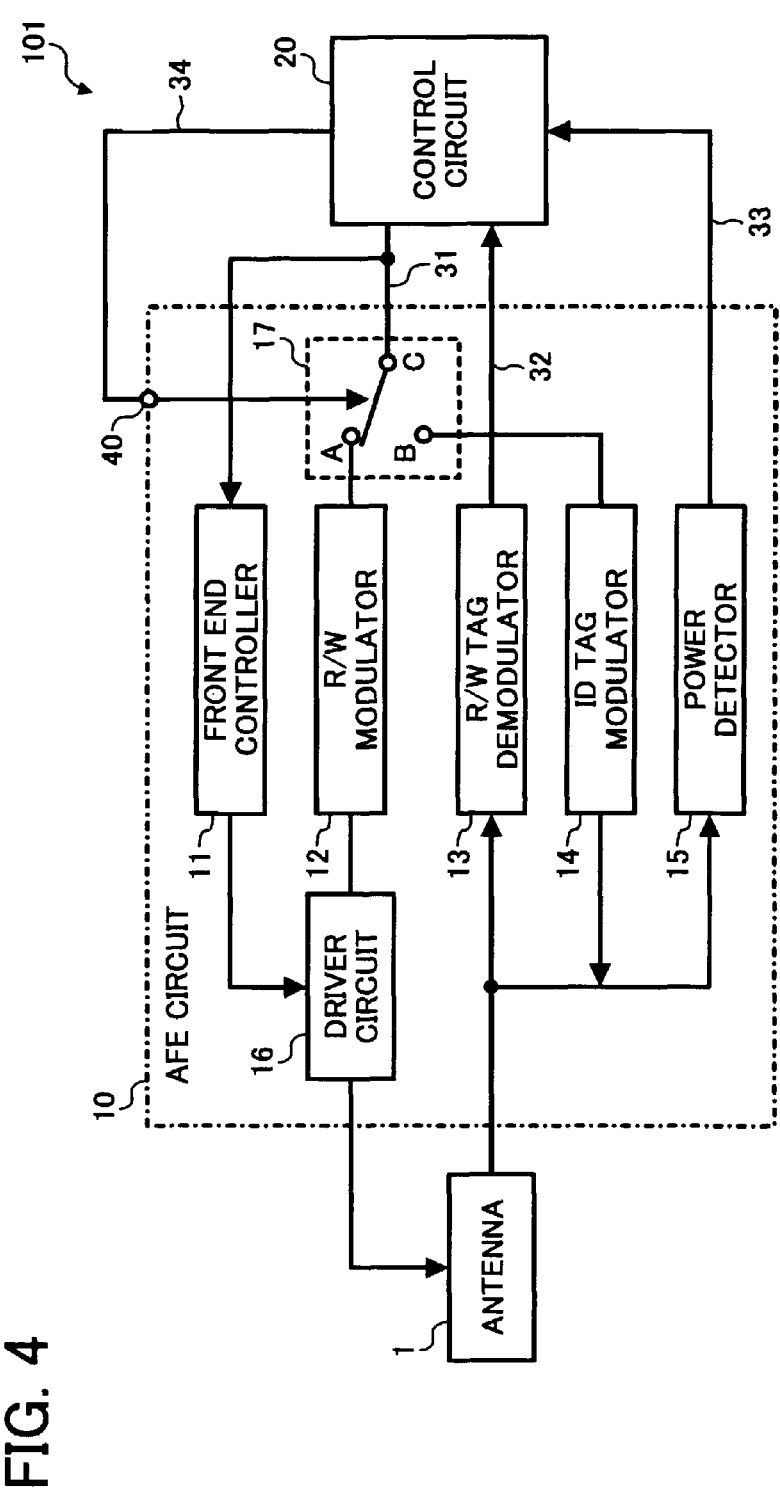
FIG. 4 is a block diagram of a data communications apparatus according to another embodiment.

Referring to FIG. 4, a wireless communications apparatus 101 according to another example embodiment is explained. FIG. 4 illustrates the wireless communications apparatus 101 which is similar to the wireless communications apparatus 100 of FIG. 2, except for a signal line to the input switch 17 to switch between the terminal A and B of the input switch 17. More specifically, the AFE circuit 10 is provided with a terminal 40 for connecting the communication line 34 from the control circuit 20 to the input switch 17 so that the control circuit 20 directly controls the selection of the terminals A and B.

Accordingly, the control circuit 20 sends the signal to connect the terminal C to the terminal A of the input switch 17 so as to connect the serial input line 31 to the R/W modulator 12 in a case when the AFE circuit 10 is caused to act as the ID-tag read-write device. Also, the control circuit 20 sends the signal to connect the terminal C to the terminal B of the input switch 17 so as to connect the serial input line 31 to the ID-tag demodulator 14 in a case when the AFE circuit 10 is caused to act as the ID tag.

The contents of this patent specification may be conveniently implemented using a conventional general purpose digital computer programmed according to the teachings of this patent specification, as will be apparent to those skilled in the computer art. Appropriate software coding can readily be prepared by skilled programmers based on the teachings of this patent specification, as will be apparent to those skilled in the software art. This patent specification may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application, No. JPAP2004-367279 filed on Dec. 20, 2004 in the Japan Patent Office, the entire contents of which are incorporated by reference herein.

What is claimed is:

1. A data communication apparatus having an ID-tag function and an ID-tag read-write function, comprising:
   a control circuit configured to generate data; and
   an analog front-end circuit electrically connected between an antenna and the control circuit, the antenna being configured to receive a signal from other ID tags and to send a signal from the apparatus;
   a first modulation circuit configured to modulate data to be transmitted to another ID-tag read-write device as a response to a request from said another ID-tag read-write device and to send the modulated data to the antenna;
   a second modulation circuit configured to modulate data to be transmitted to other ID tags;
   a driver circuit configured to amplify an output from the second modulation circuit to drive the antenna;
   a demodulation circuit configured to demodulate data sent from the other ID tags and demodulate data from said another ID-tag read-write device; and
   an input switch configured to selectively input data to one of the first and second modulation circuits, the data being sent from the control circuit to the analog front-end circuit.

2. The data communication apparatus of claim 1, wherein the analog front-end circuit further comprises a front-end control circuit configured to receive a command signal sent from the control circuit and to control the input switch in accordance with the command signal received.

3. The data communication apparatus of claim 2, wherein the front-end control circuit controls activation of the driver circuit in accordance with the command signal received from the control circuit.

4. The data communication apparatus of claim 3, wherein the analog front-end circuit further comprises a power detector configured to receive a signal from the antenna when the antenna receives the signal from other read-write devices and to transmit a trigger signal to the control circuit to activate the control circuit.

5. The data communication apparatus of claim 1, wherein the analog front end circuit further comprises a signal input terminal to receive a command signal from the control circuit and is further configured to control the input switch in accordance with the command signal received.

6. The data communication apparatus of claim 1, wherein the first and second modulation circuits and the demodulation circuit are formed in a single integrated circuit.

7. The data communication apparatus of claim 1, wherein the analog front-end circuit is formed in a single integrated circuit.

8. The data communication apparatus of claim 1, wherein the analog front-end circuit and the control circuit use a serial digital communication method to exchange data with each other.

9. The data communication apparatus of claim 1, wherein the first modulation circuit uses a load modulation method and the second modulation circuit uses an amplitude shift keying modulation method.

10. The data communication apparatus of claim 1, wherein the first modulation circuit and the demodulation circuit use a load modulation method.

11. The data communication apparatus of claim 1, wherein the data communication apparatus, under the ID-tag function, transmits first tag information in response to a first request from a wireless communication device for said first tag information, and under the ID-tag read-write function, transmits a second request for second tag information to another ID tag and receives said second tag information from said another ID tag in response to said second request.

12. The data communication apparatus of claim 11,
wherein said first modulation circuit modulates data corresponding to the first tag information, in response to said first request from said wireless communication device, and sends the modulated data to the antenna, and
wherein said second modulation circuit modulates data corresponding to said second request to said another ID tag.

13. The data communication apparatus of claim 1,
wherein the analog front-end circuit further comprises a power detector configured to detect an electromotive force generated at the antenna when the antenna receives said request from said read-write device, and transmits a trigger signal to activate the control circuit, and
wherein the control circuit transmits a command for instructing the analog front-end circuit to perform an ID tag function only when said analog front-end circuit is not performing an ID-tag read-write function.

* * * * *